CALL OFFERING CIRCUITS

Filed May 29, 1967 5 Sheets-Sheet 1

INVENTOR.
ERIC BIERMAN

BY Rogers, Bereskin, & Parr

CALL OFFERING CIRCUITS

Filed May 29, 1967 5 Sheets-Sheet 2

INVENTOR.
ERIC BIERMAN

BY *Rogers, Bereskin, & Parr*

INVENTOR.
ERIC BIERMAN
BY Rogers, Bereskin, & Parr

INVENTOR.
ERIC BIERMAN
BY Rogers, Bereskin, & Parr

March 17, 1970 E. BIERMAN 3,501,596

CALL OFFERING CIRCUITS

Filed May 29, 1967 5 Sheets-Sheet 5

INVENTOR.
ERIC BIERMAN
BY
Rogers, Bereskin, & Parr

3,501,596
CALL OFFERING CIRCUITS

Eric Bierman, Toronto, Ontario, Canada, assignor to Northern Electric Company Limited, Montreal, Quebec, Canada Filed May 29, 1967, Ser. No. 641,824
Int. Cl. H04m 3/00, 3/60
U.S. Cl. 179—18 14 Claims

ABSTRACT OF THE DISCLOSURE

A common control telephone system, employing an incoming trunk, a register connectible to the trunk, and a marker connectible to the register, for establishing a no-test connection to a busy called party and then for automatically establishing a normal connection to such party after termination of his existing call. Establishment of a no-test connection to the called party operates a trunk relay which signals the register to retain its digit information and remain attached to the trunk, after the marker releases. Release of the called party's existing call releases the trunk relay, signalling the register to recall a marker, which then establishes a normal connection to the called party.

This invention is generally concerned with telephone equipment of the type including a register which stores digit and other information needed to establish a connection between called and calling lines, and which passes the stored information on to switching equipment for the latter to establish such connection. The invention relates to a register which will, on signal, remain attached to the calling line with its stored information intact while releasing the switching equipment, and which will, on further signal, recall the switching equipment. The invention further relates to the combination of such a register with a cooperating trunk circuit in a manner that will allow a toll operator to offer a toll or long distance call to a busy subscriber in a convenient manner.

At times it is desired to interrupt a local call to a busy telephone party in order to offer the party a long distance call. This procedure, i.e. breaking in on a party already engaged in another connection, is well known and is called a "no-test" call. In the earliest method, the procedure required thre steps, namely: (1) the operator (usually located in a distant office) who is placing the call to the called party selects an idle trunk and dials the party's number (2) finding his line busy, she disconnects, selects a special trunk with access to busy connections, again dials the party's number, and offers him the call (3) if he accepts, she tells him to hang up and when he does, she disconnects and dials his number again on a normal trunk, since the special trunk is of low traffic capacity and is used only to offer a toll call, not to carry it.

Typical crossbar telephone equipment, such as No. 5 crossbar equipment, combines the first two steps by having a completing marker test to see whether or not the party's line is busy. If the party's line is idle, the marker selects a normal path to him and only if he is busy does the marker select a special trunk or dedicated path. However, when the party agrees to accept the call, he must still hang up and the operator must still redial his number, at which time the marker will select a normal path.

This invention, in a typical application, eliminates step (3), i.e. the need for redialing the called subscriber's number. Briefly, this is accomplished as follows. On a no-test or break in call, after a no-test connection has been set up to the busy called party (after which the marker releases), the register remains locked to the calling trunk, instead of releasing. When the called party hangs up to accept the toll call, the release of the called line signals the trunk which signals the register, and the register recalls a marker which places the call through a normal path.

The invention may also be used for "camp-on" calls, as will be described.

In the circuit drawings, detached contact notation is used, a normally open relay contact being denoted by an "X" and a normally closed contact by a "—." As is conventional, the "X" notation is also used to indicate switch crosspoints.

Figure 7:
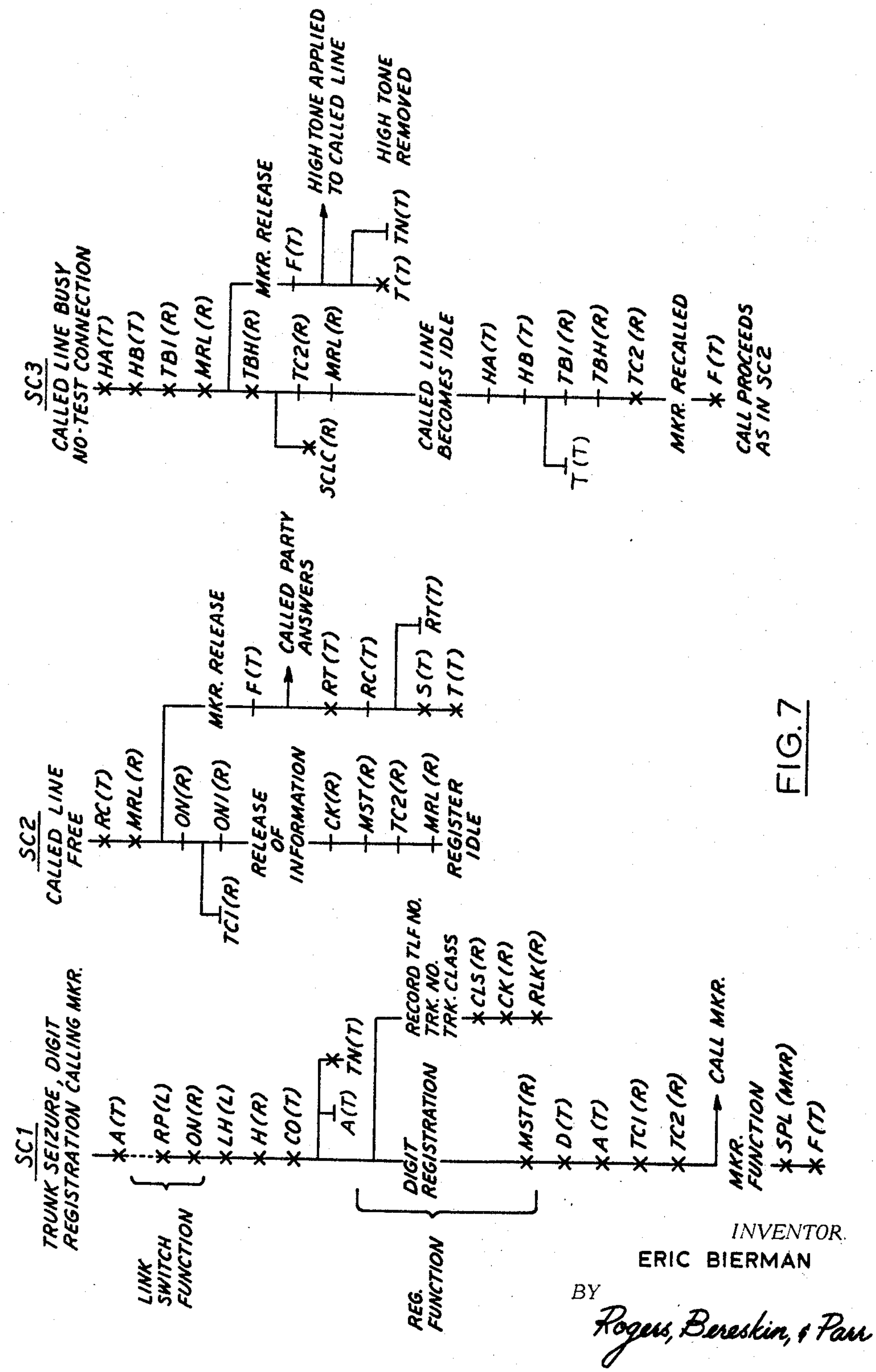
FIG. 7 illustrates three sequence charts SC1, SC2, SC3 outlining the sequence of operations of the trunk and register of FIGS. 3 and 4.

In the sequence charts, FIG. 7, an "X" indicates relay operation, while a "—" indicates relay release.

The invention will be described with reference to a No. 5 crossbar telephone system, but the invention is also applicable to a senderized step-by-step system or, in fact, to any register control system, whether rotary, crossbar or reed.

BACKGROUND

Figure 1:
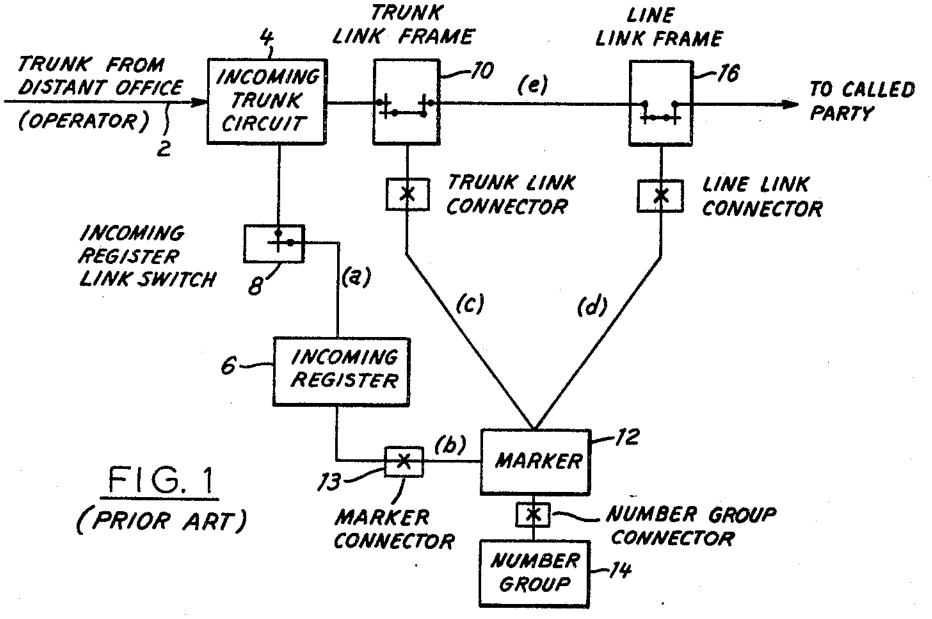
FIG. 1 (PRIOR ART)
FIG. 1 illustrates the organization of the parts of a No. 5 crossbar office used to accept and control incoming toll calls.

Long distance or toll calls placed by an operator to a called party in a telephone exchange served by No. 5 crossbar equipment are generally placed as follows, with reference to FIGURE 1. When the operator places a call, this activates signalling leads 2 to the telephone exchange where the called party is located, and an incoming trunk 4 in such exchange as seized. When the incoming trunk is seized, it seizes an idle incoming register 6 through an incoming register link switch 8, connection *a*. When the register is attached and ready to receive digits, a signal is returned to the distant office to forward the digit information, i.e. the telephone number being called.

In addition to receiving and storing the called number digits, the register also makes a note of the trunk link frame number (indicated at 10) to which the incoming trunk 4 is attached, the trunk location on the trunk link frame, and the class of call. The register then gains access to a completing marker 12 through a marker connector 13, connection *b*, and transmits the stored information to the marker. The marker seizes the trunk link frame 10, connection *c*, then seizes a number group frame 14, presents to it the called number digits, and receives from it the line link frame number (indicated at 16) on which the called party's line appears and the location of called party's line on the line link frame. The marker then seizes the line link frame 16, connection *d*, performs a line busy test on the called line, and, if the called line is idle, the marker closes appropriate switches on the trunk link and line link frames to establish a connection *e* between them. Ringing is then applied. The marker checks the ringing and then releases itself, the register 6, and the link switch 8 from the connection.

If the called line is busy, the marker sets up a special or no-test connection to the called party so that the operator can talk to him and ask if he wishes to accept the long disance call. In the past, after the marker had completed its functions of setting up this special no-test connection to the called line, the marker then released the register 6, the link switch 8, and itself from the connection. At the same time, the digit information which was stored in the register was erased.

With the invention, after the marker has set up a no-test connection to the busy called party, it releases itself from the register, but it does not release the register from the incoming trunk circuit. Further, the digit information stored in the register remains stored there.

Now that the operator is connected to the called party via the no-test connection, she talks to him and, assuming that he agrees to accept the toll call, he hangs up. This signals the register 6, which is still attached to the trunk 4, to recall a marker (any marker). The marker, when it connects to the register 6, takes the information as to the called number from it and is able to set up connections *c*, *d* and *e* without the need for the operator redialing the called number.

GENERAL DESCRIPTION

Figure 2:
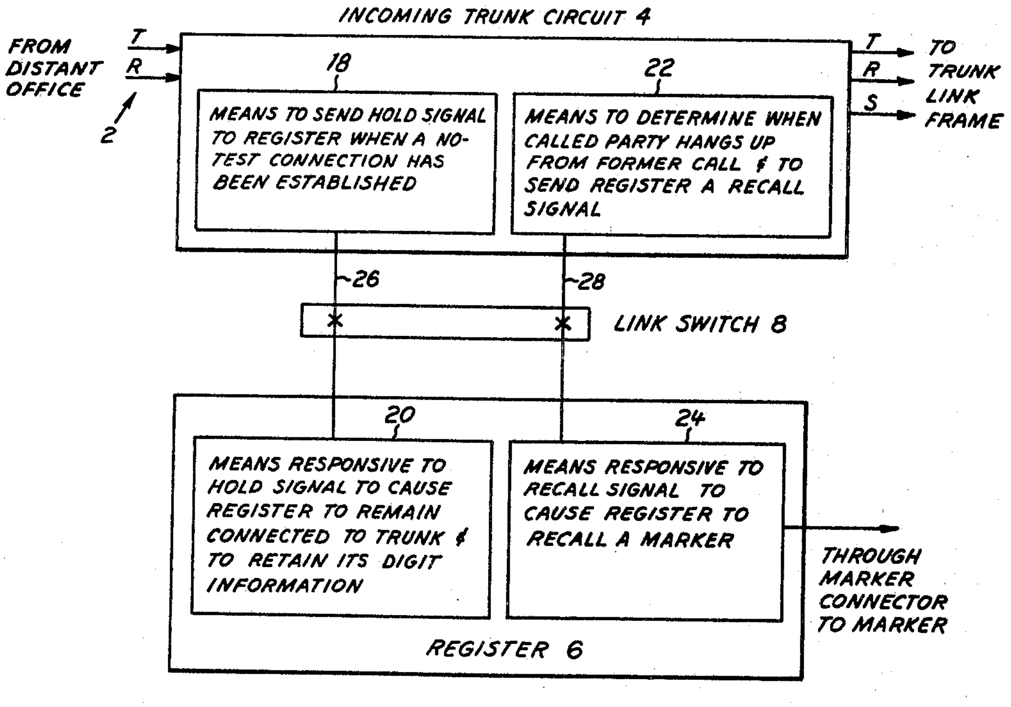
FIG. 2 shows in block diagram form a trunk and register modified according to the present invention.

The incoming trunk and incoming register circuits that accomplish this task are shown in block form in FIGURE 2. The trunk 4 contains means 18 to send a hold signal to the register when a no-test connection, instead of a normal connection, has been established to the called party. The register contains hold means 20 responsive to this signal to cause the register to remain locked to the trunk with its digit information intact, after the marker releases. The trunk contains further means 22 to detect when the called party hangs up from his former conversation and to send the register a recall signal. The register contains recall means 24 responsive to such further signal to recall a marker to set unp a normal connection to the called party. Two leads 26 and 28 have been shown for the hold and recall signals, but in practice the number of available leads is limited, and a further feature of the invention is that only one lead (lead 50, FIGS. 3 and 4) is used for both signals, and this lead is a conventional one used for other purposes as well.

DETAILED DESCRIPTION

An illustrative embodiment of the present invention will next be described in more detail, with particular reference to FIGURE 3, which shows a trunk circuit according to the present invention, and FIGURES 4 to 6, which show an incoming register circuit modified according to the present invention. First a trunk circuit, and then the register circuit, will be described.

To assist in following the operation of the embodiment described, the sequence charts, FIG. 7, should be referred to. The first sequence chart, SC1, illustrates the operation from the time that the trunk circuit receives a call until the time when the marker is seized and begins setting up a connection to the called line. The second sequence chart, SC2, illustrates the operation if the called line is free. The third sequence chart, SC3, illustrates the operation if the called line is busy and a no-test connection to it is set up. In the sequence charts, after each relay designation, there appears either a (T), indicating that the relay in question is a trunk relay; an (L), indicating a link switch relay; or an (R), indicating a register relay.

TRUNK CIRCUIT

Figure 3:
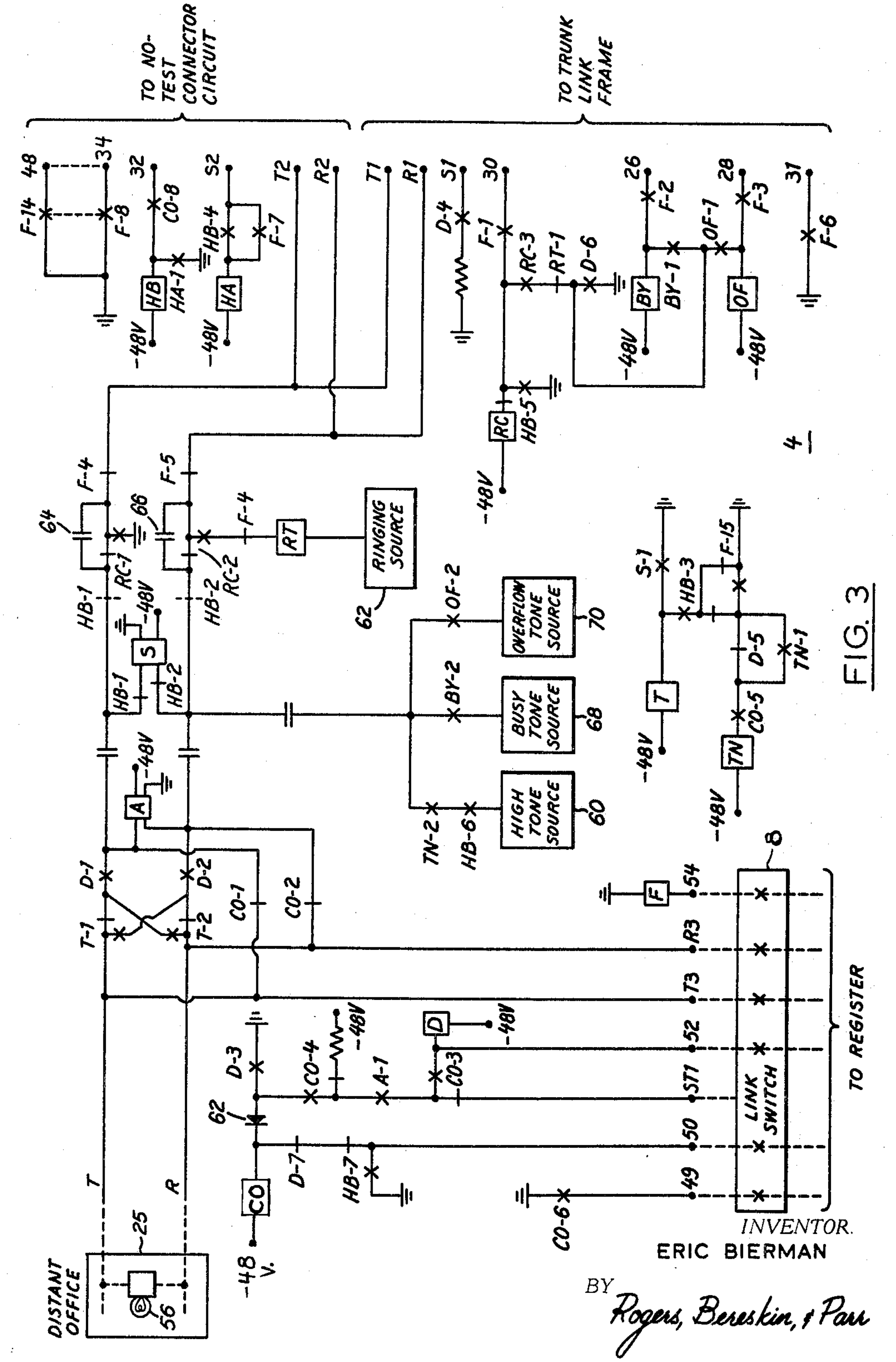
FIG. 3 shows a trunk circuit according to the invention.

The trunk circuit of FIG. 3 includes a pair of incoming tip and ring leads T, R from a distant office 25 in which the oeprator placing the call is assumed to be located. A set of outgoing tip, ring and sleeve leads T1, R1, S1 extends to a trunk link frame (for connection to the called line), while a further set of outgoing leads T2, R2, S2 extends to a no-test connector circuit, not shown. If the called line is busy, the no-test connection set up to the called line will be via leads T2, R2, S2. In addition, control leads 26 to 31 extend to the trunk link frame, while control leads 32 to 48 extend to the no-test connector circuit.

Figure 4:
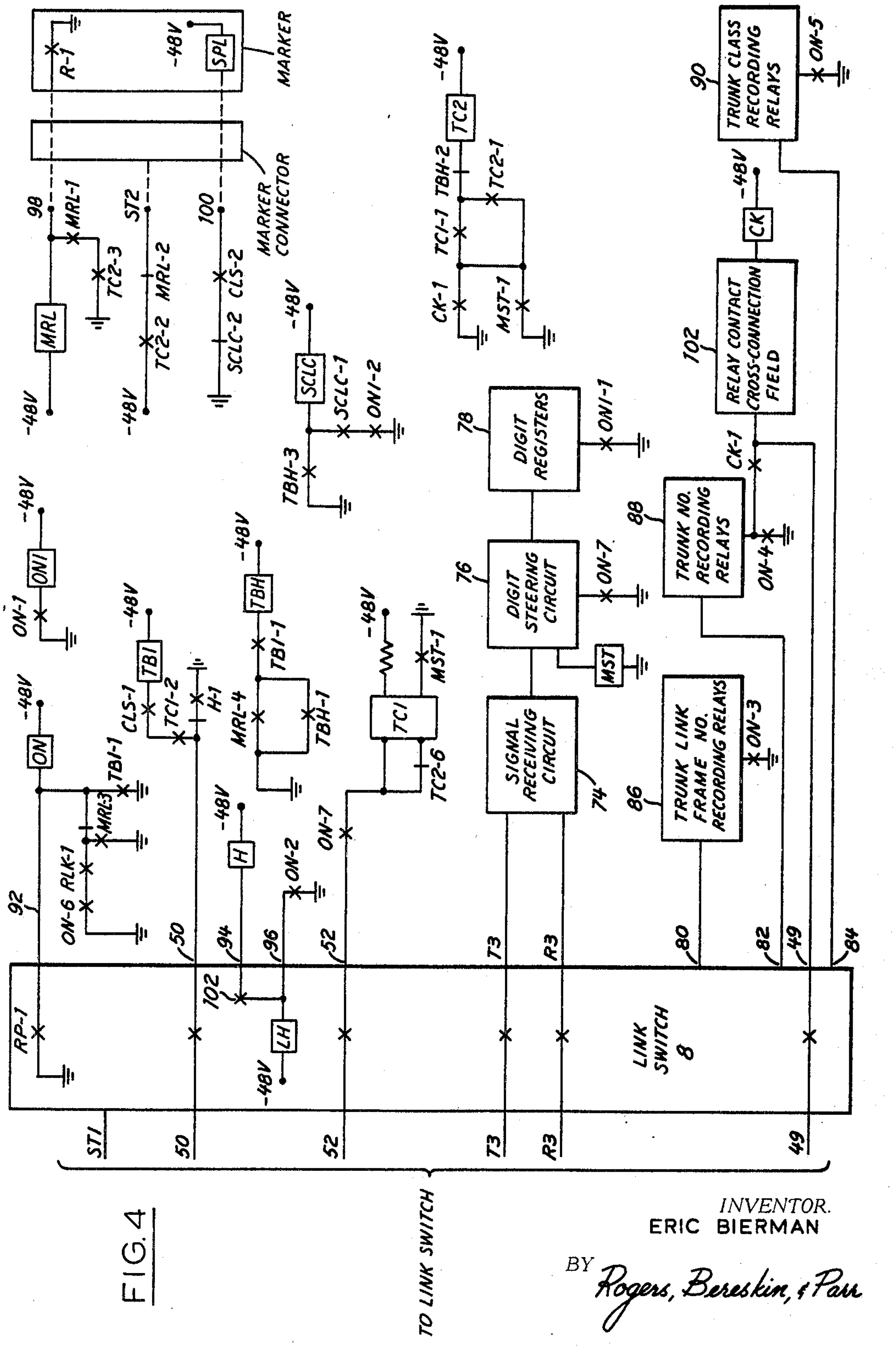
FIG. 4 shows, partly in block form, a register circuit according to the invention.

The trunk circuit also includes tip and ring leads T3, R3 for connection, through the link switch 8, to the register 6 of FIG. 4. Further control leads ST1, 49, 50, 52, 54 also extend to the link switch.

Finally, the trunk circuit includes a calling line supervision relay A, a called line busy relay BY, a cutoff relay CO, a slow release end of dialing relay D, a frame relay F, no-test holding relays HA and HB, an overflow relay OF, a ringing connect relay RC, a ringing trip relay RT, a called line supervision relay S, a reverse battery return supervision relay T, and a timing relay TN.

TRUNK CIRCUIT OPERATION

(1) Seizure and pulsing

When a call is placed by the operator from the distant office, this loops leads T, R, to operate relay A in the trunk. Battery and ground applied from relay A to leads T, R then light a polarized supervisory lamp 56 in the distant office 25, indicating to the operator there that a trunk circuit has become connected. In addition, contact A–1 closes to connect −48 v. through start lead ST1 to the link switch 8. This causes link switch 8 to seize an idle incoming register, such as that shown in FIG. 4.

When the register has been seized, it grounds lead 50 (as will be explained in the register description) to operate relay CO.

When relay CO operates, its contacts CO–1, CO–2 disconnect relay A from leads T, R, to give a clear pulsing path from leads T, R down leads T3, R3 into the register thus switching the trunk from its transmission condition to its pulsing condition. (Supervisory battery is applied to leads T, R, via leads T3, R3 from the register.) Contacts CO–3, CO–4 open start lead ST1 to the link switch; contacts CO–4 prepare a locking path for relay D; and contact CO–5 operates relay TN through released contacts D–5, HB–3, and F–15 to ground. In addition, contact CO–6 grounds lead 49 to the register, as a check to the register that relay CO has operated.

Pulsing of the called number digits now occurs, and these digits are transmitted down leads T3, R3 into the register for storage. At this time, the register also obtains from the trunk (via leads not shown) information concerning the trunk link frame number to which the trunk is connected, the trunk location on the frame, and the class of call. When the register has received and stored this information, it grounds leads 52 (by means to be described) operating relay D.

Contacts D–1, D–2 then close to reconnect relay A (and the outgoing tip and ring leads T1, R1, T2, R2) to leads T, R, while contact D–3 closes to lock relay D operated (through contact A–1 operated). The locking ground placed on lead 52 by contact D–3 is a check to the register that relays A and D are operated (i.e. that the trunk is now in transmission condition), and the register now calls in (by means to be described) a marker to establish a connection to the called line. In addition, contact D–4 closes to supply 10 ohm ground to lead S1 to hold the connection to the called line once the marker has determined that the called line is idle and has established a connection. Contact D–5 opens the operate path for relay TN.

(2) Marker function

When the marker is called in by the register and is connected thereto, it receives from the register the information necessary to establish the call. The marker then reaches the trunk, via the register 6 and link switch 8, and grounds lead 54, operating relay F. The marker at this time has also seized the trunk link frame 10 and is connected to the trunk circuit 4 via the trunk link frame.

When relay F operates, its contact F–1 connects relay RC to the marker via lead 30 to the trunk link frame. Contacts F–2 and F–3 prepare operate paths for relays BY and OF over leads 26 and 28 respectively; contacts F–4 and F–5 remove battery and ground for the moment from the called end; and contact F–6 grounds lead 31 to the marker, indicating to the marker that if the called line is busy, then a no-test connection is to be set up. Contact F–7 prepares an operate path for relay HA over lead 52 to the no-test connector circuit; contacts F–8 to F–14 ground leads 34 to 48 to the no-test connector circuit to operate select magnets therein (preparing the no-test connector for use), and contacts F–15 transfer the locking path for relay TN (through operated contacts TN–1 and F–15).

(3) Called line busy—No-test connection

If the called line is busy, so that a normal connection to the called line cannot be set up via leads T1, R1, S1, the marker then sets up a no-test connection, via leads T2, R2, S2 and the no-test connector circuit. The marker does this in conventional manner by finding the line link frame on which the busy called line appears and then operating appropriate select and hold magnets on the line link frame and the hold magnets of the no-test connector circuit (the no-test connector select magnets have already been operated by contacts F–8 to F–14) to extend the busy link through to the trunk.

When the busy line is connected to the trunk, ground on the sleeve of the busy line is extended to sleeve S2, operating relay HA. Contact HA–1 then closes to operate relay HB and also to extend ground through operated contact CO–8 over lead 32 to the no-test connector circuit to keep the hold magnets there operated.

When relay HB operates, its contacts HB–1 and HB–2 hold open the battery and ground connections through relay S to the called line, since the called line, being busy, already has battery and ground thereon. (Contacts F–4, and F–5 also hold battery and ground from the called line, but relay F will release shortly, when the marker releases.)

In addition, contacts HB–3 prepare an operate path for supervision relay T (relay T will operate when relay F releases, releasing contacts F–15), and contact HB–4 closes to provide a path to hold relay HA operated from sleeve S2 to the called line when relay F releases. Contacts HB–5 open the operate path of relay RC so that ringing cannot be applied to the called line (since it is already in service) and at the same time return ground to the marker over lead 30 to satisfy the ringing check, so that the marker may release.

Further, contact HB–6 closes to connect high tone from a tone source 60 through contact TN–2 to the calling line (i.e. the operator). Ths high tone is not yet connected to the called line because of operated contacts F–4, F–5.

Finally, contacts HB–7 operate to disconnect relay CO from lead 50 (relay CO remains operated through diode 62 and operated contact D–3), and to place ground on lead 50 as a hold signal to the register to remain connected to the trunk when the register releases. The manner in which the register means connected to the trunk will be described in the register description.

Having set up the no-test connection, the marker now releases, releasing relay F. When relay F releases, its contacts F–8 to F–14 open, releasing the no-test connector select magnets (the no-test connector hold magnets, however, remain operated from the ground through contact HA–1 and lead 32, to maintain the no-test connection). Contacts F–1, F–2, F–3, F–6 open leads 30, 26, 28, 31 to the trunk link frame since these leads are no longer needed. Contacts F–4, F–5 release, connecting the high tone to the busy called line as an indication to the called party that a break-in is occurring.

Finally, contacts F–15 release, releasing timing relay TN and operating relay T. When relay TN (which is slow release) releases, contact TN–2 opens removing the high tone from the called and calling lines, so that only a brief period of high tone is applied. When relay T operates, it contacts T–1 and T–2 reverse the polarity of the direct current applied to leads T, R, extinguishing the polarized superiversory lamp 56 as an indication to to the operator that a no-test connection has been established.

(4) Called line becomes idle (called party accepts toll call)

Assume that after the operator talks to the called party and offers him the toll call, he agrees to accept the call and hangs up from his present local call.

When the called line becomes idle, ground is removed from sleeve lead S2, releasing relays HA and HB, as well as releasing the no-test connection. Contacts HB–1 now release to release supervision relay T, again reversing the battery and ground applied through relay A to leads T, R to light the polarized supervisory lamp 56 at the operator switchboard. Relighting of this lamp indicates to the operator that the called party has hung up and is no longer connected to the line.

(5) Recalling a marker

When relay HB releases, its contacts HB–8 release, removing ground from lead 50 to the register. As will be described, this constitutes a recall signal to the register, which then recalls a marker to establish a normal connection (via leads T1, R1, S1) to the called line. When a marker becomes connected, it reoperates relay F as before (as described under section A(2) for Marker Function). Contacts F–1, F–2, F–3, F–6 then connect leads 30, 26, 28, 31 to the marker (via the trunk link frame). The marker then places ground on lead 30, operating relay RC. When relay RC operates, its contacts RC–1, RC–2 disconnect leads T, R from leads T1, R1 and extending ringing from a ringing source 62 towards the called line. Contact RC–3 locks relay RC operated (through contacts RT–1 released, D–6 operated) and returns a check ground over lead 30 to the marker, to satisfy the marker's ringing check.

The marker then releases, releasing relay F, and contacts F–4, F–5 close to connect the ringing to the called line. A small amount of ringing returns through capacitors 64, 66 to the operator.

(6) Called party answers

When the called party answers, looping leads T1, R1, then relay RT operates, and contact RT–1 releases relay RC, terminating the ringing. When relay RC releases, its contacts RC–1 and RC–2 release relay RT and connect talking battery and ground through relay S to the called party. Contact S–1 then operates relay T, and relay T again returns reverse battery supervision to the operator, extinguishing lamp 56 as an indication that the called party has answered.

(7) Disconnect

When the called party releases, relay S releases, releasing relay T and again reversing the polarity of the trunk to the distant operator, lighting lamp 56 as an indication that the connection has been released. The operator then disconnects, releasing relay A and hence relay D. Contact D–4 removes the ground from sleeve S1, releasing the hold magnets (not shown) of the trunk link frame and line link frame to release the connection. Contact D–3 releases relay CO.

If the operator releases first (e.g. if the called party will not accept the toll call), relay A releases, releasing relay D, which again releases relay CO and the connection to the called line, thus in turn releasing relays S and T.

(8) Called line busy

If the marker, when it is recalled, finds the called line busy (e.g. if the called party momentarily releases but then lifts his receiver before a normal connection can be established to him), then the marker grounds lead 26, operating relay BY. Relay BY locks operated through contacts BY–1 and D–6, and returns a check ground on lead 26 to the marker, while contact BY–2 connects busy tone from a source 68 to the distant office. (The marker will not again establish a no-test connection, for reasons to be explained.)

(9) Overflow

If the called line is initially busy, but a no-test channel is not available, or when the called line is idle but no channel is available, the marker grounds lead 28, operating relay OF. Relay OF locks operated through contacts OF–1 and D–6, returns a check ground on lead 28, and contact OF–2 connects overflow tone from a source 70 to the distant office.

(10) Called line idle

If the called line is initially idle, then a normal connection is established immediately, there being no need for a no-test connection. The procedure here is the same as that described under section A(5), i.e. the marker operates relay F, establishes a normal connection, operates relay RC, and then releases, ringing then being applied to the called line.

B REGISTER

The register circuit, shown in FIGS. 4, 5 and 6, will next be described. With the exception of relays TBH, TBI, and SCLC (with their associated wiring), the register circuit is entirely conventional. Therefore, the register will be described and illustrated only to the extent needed to understand fully the modifications which enable the register to remain locked to the trunk with its stored information intact, after the marker has set up a no-test connection and released, and then to recall a marker when the called line becomes free.

The register, shown in outline in FIG. 4, includes incoming signalling leads T3, R3 from the trunk. These leads extend into a signal receiving circuit 74, which in turn is connected through a digit steering circuit 76 to a set of digit registers 78. The register also includes incoming control leads 49, 50, 52 from the trunk. Information leads 80, 82, 84 from the link switch 8 extend to a set of trunk link frame recording relays 86, trunk number recording relays 88, and trunk class recording relays 90. In addition, the register includes control leads 92, 94, 96 from the link switch, and other conventional incoming leads not shown.

Figure 5:
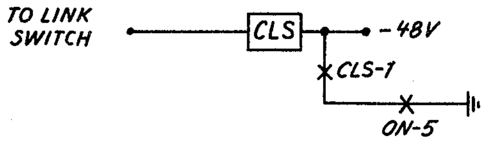
FIG. 5 shows a trunk class relay of the FIG. 4 register circuit.

The register also includes outgoing control leads 98, 100 and ST2 to the marker (via a marker connector), and other conventional control and signalling leads, such as those shown in FIG. 5, to the marker e.g. for transfer of information from the register to the marker.

The register relays that will be referred to are: a class check relay CK, a class-special marker relay CLS, a hold magnet relay H, a marker release relay MRL, a marker start relay MST, off-normal relays ON, ON1, a release link check relay RLK, a special class cancel relay SCLC, toll break-in relays TBH, TBI, and trunk cut-through relays TC1, TC2.

In addition, link switch relay RP and hold magnet LH will be discussed.

The register operation when the called line is not busy (i.e. not a no-test call) will first be described. This operation is basically conventional.

(1) Register seizure

When a call is placed to the trunk circuit of FIG. 3, operating relay A therein and placing battery on start lead ST1 to the link switch, this causes a register preference relay RP therein (not shown) to operate. Relay RP operates the link select magnets (not shown) associated with the register, selecting (assume) the register of FIG. 4, and contact RP–1 closes to operate register off-normal relay ON. Contact ON–1 then closes to operate auxiliary off-normal relay ON1. Relays ON, ON1 provide holding grounds for most parts of the register circuit.

When relay ON operates, its contact ON-2 closes to extend ground over lead 96 to the link switch to operate the link switch hold magnet LH associated with the calling trunk. This closes a number of crosspoints (not shown) in the link switch between the trunk and the register, thus extending the leads from the trunk to the register. When the cross points close, a cross point 102 extends the hold magnet operating ground from lead 96 onto lead 94 to operate register relay H. When relay H operates, its contact H–1 closes to extend ground on lead 50 through the link switch to the trunk to operate relay CO, FIG. 3. (See section (1) of the trunk circuit operation.) Relay CO, as discussed, disconnects relay A from leads T, R, to give a clear pulsing path down leads T3, R3 into the register. Supervision is provided by a supervision relay, not shown, in the signal receiving circuit 74. Contact CO–6, FIG. 3, then closes to ground lead 49, as a check to the register that the trunk has been switched to a pulsing condition.

(2) Registration of trunk frame number, trunk number, and trunk class information When the register becomes connected to the link switch 8, it receives the trunk link frame number, trunk location on the trunk link frame, and trunk class information from the control relays of the link. This information is necessary so that the marker can set up connection *e* (FIG. 1) between the appearance of the trunk circuit 4 on the trunk link frame 10 and the appearance of the called party's line on the line link frame 16. This information is recorded in the trunk link frame number relays 86, the trunk number recording relays 88, and the trunk class relays 90. The information is recorded by operating individual relays in these sets of relays, and such operated relays are locked operated through contacts ON–3, ON–4 and ON–5.

A typical relay that will be operated in the present case is class-special relay CLS shown in FIG. 5. This relay, which is one of the trunk class relays 90, locks operated through contacts CLS–1, ON–6, FIG. 4. The function of relay CLS is to close contact CLS–2, FIG. 4, grounding lead 100 towards the marker connector and marker. When a marker connector is connected to the register, the ground on lead 100 operates a relay (not shown) in the connector, causing the connector to call in a conventional "special" marker capable of setting up a no-test connection. When a special marker is connected, the ground on lead 100 operates a relay SPL in the marker, instructing the marker that it is to set up a no-test connection if the called line is busy.

When the complete trunk line frame number, trunk number and trunk class information has been received, check relay CK operates through an appropriate contact cross-connection field (shown in block form at 102) of relays 88, 90, 92 to the ground on lead 49 from the trunk. Relay CK locks operated through contacts CK–1, ON–4 and operates a link release relay RLK (not shown) to release the control relays of the link switch, so that the control relays are free to serve other trunks and the only connection between the trunk and the register is through the link switch crosspoints. At this time, relay ON locks operated through contacts RLK–1 and ON–6.

(3) Digit registration

As digits are received over incoming leads T, R, from the distant office, they are directed down leads T3, R3, through the link switch crosspoints and into the signal receiving circuit 74. Assuming for example that the register is to receive dial pulse information, the signal receiving circuit 74 includes a pulsing relay (not shown) connected across leads T3, R3, and a conventional pulse counting circuit 104 (FIG. 5) which counts the number of pulses of the pulsing relay, transfers this count to one of the digit registers shown collectively at 78, FIG. 4, and then recycles itself to receive the next digit. Digits are steered into successive digit registers by the digit steering circuit 76, which is operative once contact ON–7 has closed.

Figure 6:
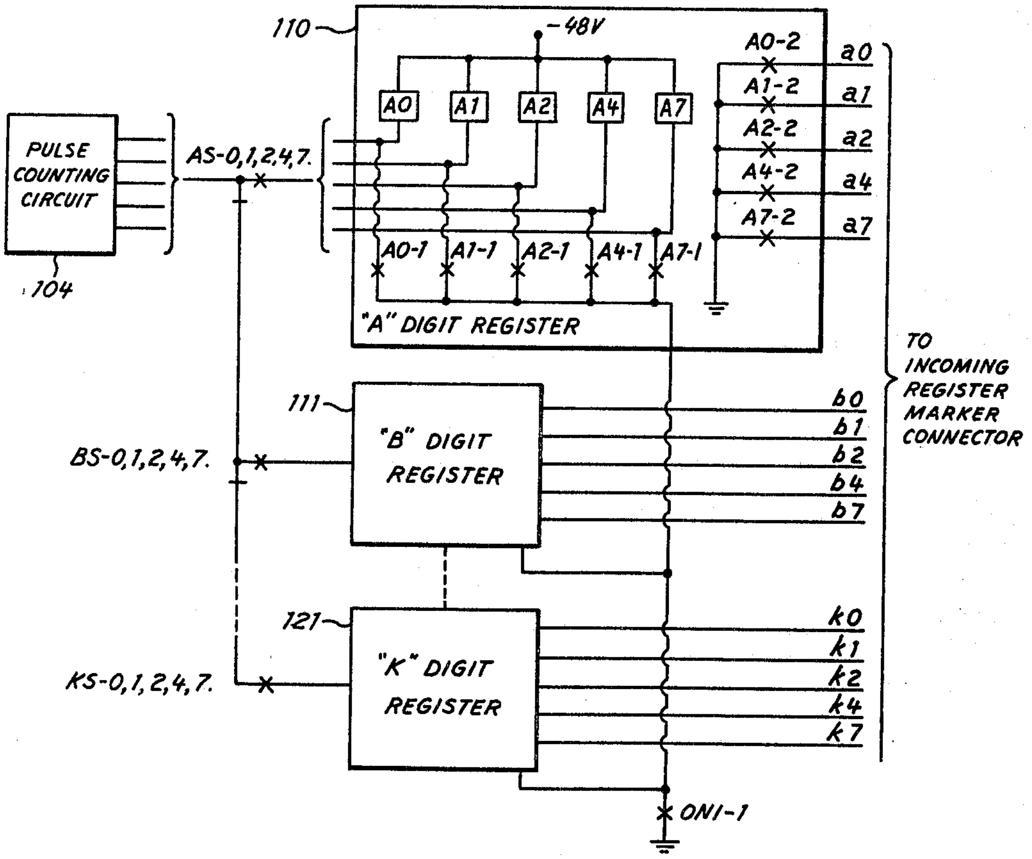
FIG. 6 shows typical digit registers for the FIG. 4 register.

A typical digit register is shown in FIGURE 6. In FIGURE 6 the pulse counting circuit 104 is shown as having five leads numbered 0, 1, 2, 4, 7 in the usual two out of five code. These leads extend through contacts of digit steering relays AS, BS, . . . KS (the steering relay coils are not shown) to a set of eleven digit registers 110 to 121 for storing digits A to K of the called number.

Before the first digit of the called number is received by the signal receiving circuit, steering relay AS is operated by means not shown in the steering circuit 76, to close contacts AS–0, 1, 2, 4, 7 to connect the pulse counting circuit leads 0, 1, 2, 4, 7 to the first digit register 110. When the first digit is received by the pulse counting circuit, ground is applied by this circuit to an appropriate two of the five leads 0, 1, 2, 4, 7 thus to operate two of the five relays A0 to A7 in the first digit register. The two operated relays lock operated through contact ON1–1. For example, if relays A0 and A2 are the operated relays, then contacts A0–2 and A2–2 close grounding two of the five leads *a*0 to *a*7. These leads *a*0 to *a*7 will eventually be connected through a marker connector to a marker, when a marker is called, thus transferring to the marker the information contained in the first digit register.

After the first digit is received, the pulse counting circuit 104 sets itself back to zero and the digit steering circuit 76 releases relay AS and operates relay BS (by means not shown) so that the next digit will be recorded in the second or B digit register 111. This process continues until all of the called number digits have been stored in the digit registers.

After all the digits have been received, the digit steering circuit operates (by means not shown) a marker start relay MST, FIG. 4. This initiates seizure of a marker to set up a connection to the called party.

(4) Calling in the marker

When marker start relay MST operates, its contact MST–1 closes, extending ground through one winding of relay TC1, released contact TC2–6, operated contact ON–7, and through lead 52 to operate relay D in the trunk circuit, FIG. 3. Relay TC1 in the register (FIG. 4) does not operate at this time since it is a differential relay and will not operate with its two windings energized in opposite directions.

As discussed in section (1) of the trunk circuit operation, when relay D operates, contacts D–1, D–2 (FIG. 3) reconnect relay A to the trunk, switching the trunk from pulsing condition to transmission condition. As also discussed, contact D–3 then returns a locking ground down lead 52 to the register as a check to the register that relay D has operated.

The locking ground on lead 52 now operates relay TC1, since one winding of relay TC1 is shorted. When relay TC1 operates, its contact TC1–1 operates relay TC2, through contacts TBH–2 released, and operated contacts TC1–1, CK–2 and MST–1.

Contact TC2–1 then locks relay TC2 operated, and contact TC2–2 closes to apply battery to start lead ST2 to a marker connector 13, causing the connector to connect the register to a marker 12.

(5) Called line idle—Normal connection established

The marker now begins its functions of setting up a connection between the trunk appearance on the trunk link frame and the called line appearance on the line link frame 16. During this process, the marker operates relay F in the trunk, as discussed in section A(2).

After the marker has set up a connection between the calling and called lines and has operated relay RC, it receives a check ground over lead 30 (FIG. 3) that ringing has been applied and then initiates the release sequence of events.

(6) Release of register and marker

The marker now grounds lead 88, FIG. 4 (by closing a contact R–1), operating marker release relay MRL in the marker. (The ground on lead 88 constitutes a release signal to the register.) Relay MRL locks operated through contacts MRL–1 and TC2–3.

Contact MRL–2 then opens to remove ground from the marker start lead ST2, thus releasing the marker connector and marker. Contacts MRL–3 operate to release release ON, which releases relay ON1. Release of relays ON and ON1 releases most operated relays in the register, including the trunk link frame relays 86, trunk number relays 88, trunk class relays 90, digit register relays and digit steering circuit relays, thus wiping out the information stored in the register. Relay TC1 also releases, due to release of contact ON–7. Hold magnet relay H, and link hold magnet LH, release due to release of contact ON–2, releasing the register from the link switch 8. Check relay CK releases due to release of contact ON–3, and relay MST releases due to release of the operated relays in the digit steering circuit 76.

When relays CK, MST release, this releases relay TC2. Contact TC2–3 then opens to release relay MRL, and the register returns to idle condition in which it may be used for another call.

(7) No-test connection

In the register operation described, it has been assumed that the marker was able to set up a normal connection to the called line. Assume now that the called line is busy, so that a no-test connection is set up instead. In that case, as discussed in section A(3), when a no-test connection is established, trunk relay HB (FIG. 3), operates (due to relay HA operation from the ground on sleeve S2), and contacts HB–8 ground lead 50 to the register as a signal that the register is to remain connected to the trunk when the marker releases. The ground on lead 50 may be termed a "hold" signal.

(8) Holding the register

The hold signal on lead 50 operates register relay TBI, via operated contacts TC1–2 and CLS–1. (Recall that relay TC1 operated before the marker was initially called in.)

The marker next initiates the release sequence by operating relay MRL, as before. Contact MRL–2 then opens to release the marker and marker connector from the register. Contacts MRL–3 also operate, in an attempt to release relay ON, but relay ON is held operated by contact TBI–1, thus holding relay ON1 operated.

Because relays ON, ON1 remain operated, all of the digit information stored in the digit registers, and the trunk information stored in relays 86, 88, 90, remains intact. In addition, the register remains connected through the link switch to the trunk because contact ON–2 maintains relay H and link hold magnet LH operated. The marker, however, has been freed for other duties.

(9) Release of relay MRL

When relay MRL operates, as just described, relay TBH operates through contacts TBI–1 and MRL–4. Relay TBH then locks operated via contact TBH–1, and contact TBH–2 opens to release relay TC2. Contact TC2–3 then opens to release relay MRL, and contact TC2–2 opens to ensure continued removal of battery from start lead ST2 after relay MRL has released.

In addition, when relay TBH operates, its contact TBH–3 closes to operate relay SCLC, which locks operated through contacts SCLC–1 and ON1–2. Contact SCLC–2 opens to block application of ground to lead 100, to prevent operation of relay SPL in the marker when it is recalled.

(10) Recalling a marker

When relay TBI releases, contact TBI–1 opens to re- to accept it and hangs up from his former local call, this releases relay HB, section A(4). Contacts HB–8, FIG. 3, then release, section A(5), removing ground from lead S2 to the register. This removal of ground, which constitutes a recall signal to the register, releases relay TBI in the register, FIG. 4.

When the called party being offered the toll call agrees leases relay TBH. Contact TBH–2 then closes to reoperate relay TC2, and contact TC2–2 closes to ground start lead ST2 to the marker connector 13. This effects connection of a marker (any marker) to the register.

Since no ground is applied to lead 100 to the marker at this time, due to operated relay SCLC, this prevents operation of special relay SPL, since its operation would cancel certain tests normally made on the called line.

(11) Marker function and release

The marker now sets up a connection between the trunk and the called party and then initiates the release sequence by operating register relay MRL, FIG. 4. Since relay TBI is released, operation of relay MRL releases relay ON and hence ON1, and the register releases normally from the trunk and from the marker.

(12) Summary of register operation

A summary of conventional register operation, as compared with modified register operation, in the event of a no-test call, is as follows. It is assumed that the register in both cases is about to call in a marker.

| Conventional (No-Test Call) | Modified (No-Test Call) |
|---|---|
| (1) Register calls in marker (operates relay TC2). | (1) Same. |
| (2) Marker sets up no-test connection. | (2) Same. |
| (3) Marker operates relay MRL | (3) Same. |
| (4) Relay MRL releases:<br>(a) Register from marker (contact MRL–2);<br>(b) Relays ON, ON1. | (4) Relay MRL releases:<br>(a) Register from marker (contact MRL–2);<br>(b) Does NOT release relays ON, ON1 (due to relay TBI operated). |
| (5) Relays ON, ON1 release:<br>(a) Digit and other information;<br>(b) Register from trunk;<br>(c) Relay TC2 (by releasing relays CK, MST). | (5) Since ON, ON1 do not release:<br>(a) Retain digit and other information;<br>(b) Register remains attached to trunk;<br>(c) Relay TC2 remains operated. |
| (6) Relay TC2 releases relay MRL. | (6) Relay MRL must be released (to permit later recall and then release of the marker), but immediate recall of the marker when MRL releases, due to TC2 operated, must be prevented.<br>(7) Therefore, relay TBH is provided, which operates when relay MRL operates (if TBI is operated), to release relay TC2. Relay TBH may be thought of as an override device.<br>(8) Relay TC2 releases relay MRL.<br>(9) On recall signal from trunk, relays TBI, TBH release, reoperating relay TC2, which recalls marker. |

If the call is abandoned by the operator before the called party releases from his previous call (e.g. if he refuses to accept the toll call), the trunk will release, reeasing relay TC1 in the register and hence releasing relays TBI, TBH. In addition, releases of relay TC1 starts a timing circuit (not shown) which in turn operates relay MRL to release the register.

"CAMP-ON" APPLICATION OF CIRCUIT

The invention may be used for "camp-on" service. In this type of service, when a calling party makes a call to a busy called party, the calling party's call waits until the called party's line becomes free, and the calling party is then automatically connected to the called party.

A typical use of the invention in camp-on service is for incoming calls in a private branch exchange (PBX) containing the basic elements previously described, i.e. incoming trunk circuits, incoming registers, link switches, a marker, etc. The details will be similar to those described, except that any calling party (and not just an operator) will be able to make camp-on calls since all the incoming trunk circuits will be equipped for this purpose.

Since the calling party ought not to be able to interfere with or listen to the called party's existing call, contacts HB–1 and HB–2 (FIG. 3) may be moved from the location shown in FIG. 3 to the location shown in dotted lines and identified by HB'–1, HB'–2, so that they disconnect leads T1, R1, R2, R2 from leads T, R when relay HB is operated. This avoids a talking connection to the called party. Provision for injection of a high tone warning signal will not be needed, since no break-in talking connection to an existing connection is to be made.

What I claim as my invention is:

1. A register, for use with a telephone system of the type having (a) a calling line over which a call may be received, (b) a called line to which a call is to be placed, (c) means operable on receipt of a call over said calling line to connect said calling line to said register to pass identification information, including called number information, from said calling line to said register, (d) switching means operable on receipt of said identification information from said register to establish a connection between said called and calling lines, (e) means operable to connect said register to said switching means following connection of said register to said calling line, to pass said identification information from said register to said switching means, said register comprising (1) storage means operable for storing said identification information, (2) first clearing means, responsive to a release signal from said switching means, to release said storage means thus removing said identification information from said storage means, and to release said means (c) to disconnect said register from said calling line, (3) hold means, responsive to a hold signal from said system, to hold both said storage means and said means (c) operated upon receipt of said release signal, thus retaining said register connected to said calling line with said information stored in said storage means, (4) second clearing means responsive to receipt of said release singal to release said means (e) both when said hold means is operated and when said hold means is released, thus to disconnect said switching means from said register, (5) and recall means responsive to receipt of a recall signal from said system to reoperate said means (e) to reconnect said register to said switching means.

2. A register according to claim 1 including (6) common locking means operable, following connection of said registers to said calling line, for locking said storage means in a condition in which said information stored therein is retained therein and for locking said means (c) operated to hold said register connected to said calling line, (7) means operable in response to storage in said storage means of said identification information to operate said means (e) to connect said register to said switching means, and wherein (8) said first clearing means includes release means responsive to said release signal to release said locking means, thus to release said storage means and said means (c), (9) and said hold means (3) includes means responsive to said hold signal to hold said locking means operated despite operation of said release means, thus to retain said storage means and said means (c) operated.

3. A register according to claim 1 including (6) common locking means operable, following connection of said register to said calling line, for locking said storage means in a condition in which said information stored therein is retained therein, and for locking said means (c) operated to hold said register connected to said calling line, (7) means operable in response to storage in said storage means of said information to operate said means (e) to connect said register to said switching means, and wherein (8) said first and second clearing means include a common release device responsive to said release signal to release said means (e) and to release said locking means, thus to release said storage means and said means (c), (9) said hold means (3) includes means responsive to said hold signal to hold said locking means operated despite the occurrence of said release signal, thus to retain said storage means and said means (c) operated,

(10) said locking means includes means for locking said release device operated upon operation of said release device, so that upon release of said locking means by said release device, said release device will then in turn release,

(11) and said hold means includes override means responsive to operation of said release device when said hold means is operated, for releasing said release device despite continued operation of said locking means, thus freeing said release device for reuse following recall of said switching means.

4. Apparatus acording to claim 3 wherein said register includes a common conductor for carrying said hold and recall signals, said recall signal being constituted by termination of said hold signal, and wherein said recall means includes means responsive to release of said of said holding means, with said locking means operated, for operating said means (e) to connect said register to said switching means.

5. Apparatus according to claim 1 wherein said telephone system is a common control system, said means (c) being a register link switch, said switching means (d) including a completing marker and a plurality of switching paths operable by said marker, said means (e) being a marker connector, and wherein (f) said storage means includes a plurality of storage relays operative selectively to store identification information, (g) said register includes locking means including a locking relay having a plurality of contacts, and means for operating said locking relay following connection of said register to said calling line, said locking means including means connecting contacts of said locking relay to lock in operated condition any operated storage relays, (h) said register further includes means including a normally open contact of said locking relay for maintaining said link switch operated to hold said calling line connected to said register, (i) said register further includes a marker start lead for connection to said marker connector, and start means operative following receipt of said identification information by said register to apply a signal to said marker start lead to effect and maintain operation of said marker connector, thus to connect a marker to said register, said locking means including a normally open contact of said locking relay for holding said start means operated to maintain said marker connected to said register, (j) said first and second clearing means together include a marker release signal operative in response to a release relay from said marker to disconnect said start lead from said marker connector, thus to release said marker, and to release said locking relay, thus to release said storage relays and said link switch, (k) said locking means includes means for locking said marker release relay operated upon operation of said marker release relay, (l) said hold means includes means responsive to said hold signal to maintain said locking relay operated, to keep said storage relays, said marker release relay, and said link switch operated, (m) said register includes a common conductor for carrying said hold and recall signals, said recall signal being constituted by termination of said hold signal, (n) and said hold maens and said recall means include common switch means responsive to operation of said marker release relay when said hold means is operated, for releasing said marker release and said marker start means despite continued operation of said locking means, and responsive to release of said hold means following termination of said hold signal with said locking means still operated, to reoperate said marker start means to initiate reconnection of said marker to said register.

6. A telephone system for making no-test calls, said telephone system including (a) a call receiving circuit over which said no-test call is received, (b) a called line to which said call is to be placed, (c) a register to receive, from said call receiving circuit, calling line and called number identification information, said register including storage means to store said information, (d) means operable to connect said register with said call receiving circuit for said information to be passed to said register, (e) switching means operable, on receipt of said information from said register, to establish a normal connection to said called line if said called line is free and to establish a no-test connection to said called line if said called line is busy, (f) means operable following connection of said register to said call receiving circuit for connecting said switching means to said register, to pass said information from said register to said switching means, said switching means including means to provide a release signal to said register after said switching means has set up either a no-test or a normal connection to said called line, (g) said call receiving circuit including (1) hold signal means responsive to establishment of a no-test connection to said called line to transmit a hold signal to said register, and (2) recall signal means responsive to release of said no-test connection to transmit a recall signal to said register, (h) said register including (1) first clearing means, responsive to said release signal from said switching means, to release said storage means thus to release said information stored therein, and to release said means (d) to disconnect said register from said call receiving circuit, (2) hold means, responsive to a hold signal from said call receiving circuit, to hold both said storage means and said means (d) operated on receipt of said release signal, thus retaining said information stored in said storage means and retaining said register connected to said call receiving circuit, (3) second clearing means responsive to receipt of said release signal to release said means (f)

both when said hold means is operated and when said hold means is released, thus to disconnect said switching means from said register, (4) and recall means responsive to a recall signal from said call receiving circuit to initiate reconnection of said register to said switching means for said switching means to establish a normal connection to said called line.

7. Apparatus according to claim 6 including a control lead for connection between said call receiving circuit and said register, and wherein (i) said call receiving circuit further includes (3) a pair of signal leads to carry an incoming call into said call receiving circuit, (4) supervisory means connected to said signal leads and operative upon receipt of a call thereon, (5) cutoff means connected to said control lead and operative upon receipt of a signal from said register over said control lead indicating that said register has become connected to said call receiving circuit, to disconnect said supervisory means from said signal leads, (j) said hold signal means including means responsive to establishment of a no-test connection to said called line, for disconnecting said cutoff means from said control lead while maintaining said cutoff means operated, and for transmitting said hold signal over said control lead, (k) said hold means in said register being coupled to said control lead.

8. Apparatus according to claim 7 wherein said hold signal means and said recall signal means together include common means for transmitting said hold signal over said control lead upon establishment of said no-test connection and for terminating application of said hold signal to said control lead upon release of said no-test connection, said recall signal thus being constituted by termination of said hold signal, said recall means including means responsive to release of said hold means to initiate reconnection of said switching means to said register.

9. Apparatus according to claim 6 wherein said called line includes a sleeve lead on which a busy signal appears when said called line is busy, and said hold means includes means for connection to said sleeve lead by said switching means upon establishment of a no-test connection, said hold signal means being operative upon receipt of said busy signal thereby.

10. Apparatus according to claim 9 wherein said call receiving circuit includes supervision means for applying direct current to said called line, and said hold signal means includes means responsive to receipt of said busy signal for disabling said supervision means to prevent application of said direct current to said called line.

11. Apparatus according to claim 6 wherein said call receiving circuit includes (5) ringing means operable to initiate application of ringing to said called line, (6) means for connecting said ringing means to said switching means for a ringing initiate signal from said switching means to initiate operation of said ringing means, (7) said ringing means including means to provide a ringing check signal over said means (6) to indicate to said switching means that ringing has been initiated, (8) and means responsive to establishment of said no-test connection to disable said ringing means to prevent application of ringing to said called line and to transmit a said ringing check signal over said means (6) to satisfy said switching means.

12. Apparatus according to claim 6 including means responsive to establishment of said no-test connection to transmit a short duration break-in signal to said called line as an indication to said called line that a no-test connection has been established to it.

13. Apparatus according to claim 6 wherein said call receiving circuit is an incoming trunk circuit, said apparatus including a pair of signalling leads connected to said trunk circuit, said trunk circuit including (9) supervisory means for applying a first polarity direct current signal to said signalling leads,

(10) means responsive to establishment of said no-test connection for reversing the polarity of said direct current signal as an indication to said signalling leads that said no-test connection has been established,

(11) means responsive to release of said no-test connection to restore the polarity of said direct current signal to said first polarity,

(12) and means responsive to establishment of a normal connection to said called line following release of said no-test connection, again to reverse the polarity of said direct current signal.

14. Apparatus according to claim 6 wherein said telephone system is a common control system, said means (d) including a register link switch, said switching means including a completing marker and a plurality of switching paths operable by said marker, and said means (f) including a marker connector, said storage means comprising a plurality of storage relays including a class-special relay, said means (d) including means for operating said class-special relay following connection of said register to said trunk, means responsive to operation of said class special relay for providing a signal to said marker connector that a marker to be connected to said register is to set up a no-test connection to said called line if said called line is busy, and means operative in response to operation of said second clearing means provided that said hold means is operated, to block transmission of said last mentioned signal to said marker connector.

References Cited

UNITED STATES PATENTS 3,381,095 4/1968 Baker et al. ---------- 179—27

WILLIAM C. COOPER, Primary Examiner

U.S. Cl. X.R.

179—27